(12) United States Patent
Duerr et al.

(10) Patent No.: US 11,732,937 B2
(45) Date of Patent: Aug. 22, 2023

(54) MULTI-PROFILE ADAPTER ASSEMBLY

(71) Applicant: Spectronics Corporation, Melville, NY (US)

(72) Inventors: John Duerr, Massapequa Park, NY (US); Gabriel Dash, Medford, MA (US)

(73) Assignee: Spectronics Corporation, Melville, NY (US)

( * ) Notice: Subject to any disclaimer, the term of this patent is extended or adjusted under 35 U.S.C. 154(b) by 0 days.

(21) Appl. No.: 17/728,572

(22) Filed: Apr. 25, 2022

(65) Prior Publication Data

US 2022/0364775 A1    Nov. 17, 2022

Related U.S. Application Data

(60) Provisional application No. 63/328,337, filed on Apr. 7, 2022, provisional application No. 63/292,163, filed
(Continued)

(51) Int. Cl.
*F25B 41/20* (2021.01)
*F25B 45/00* (2006.01)
(Continued)

(52) U.S. Cl.
CPC ............ *F25B 41/20* (2021.01); *F16K 1/14* (2013.01); *F16K 1/36* (2013.01); *F16L 29/00* (2013.01);
(Continued)

(58) Field of Classification Search
CPC .... F25B 41/20; F25B 2345/006; F25B 45/00; F16K 1/14; F16K 1/36; F16K 15/04; F16K 15/1823; F16L 29/00; F16L 37/407
See application file for complete search history.

(56) References Cited

U.S. PATENT DOCUMENTS

| 5,244,010 A | * | 9/1993 | Barjasteh | ............... F16L 37/23 |
| | | | | 137/614 |
| 10,328,767 B2 | * | 6/2019 | Wöhner | ................ F16L 37/23 |
| 2013/0118187 A1 | * | 5/2013 | Carrubba | .............. F16L 29/007 |
| | | | | 62/77 |

FOREIGN PATENT DOCUMENTS

| DE | 102016010169 A1 | 2/2018 |
| WO | 2018033166 A1 | 2/2018 |
| WO | WO-2019170601 A1 * | 9/2019 ............. B67D 7/005 |

OTHER PUBLICATIONS

Extended European Search Report for corresponding EP Application No. 22172280.4, dated Sep. 14, 2022, 6 pages.

* cited by examiner

*Primary Examiner* — Marina A Tietjen
(74) *Attorney, Agent, or Firm* — Faegre Drinker Biddle & Reath LLP

(57) ABSTRACT

A multi-profile adapter assembly is disclosed for connecting a pressurized fluid source to two or more different fittings. The adapter assembly includes an injector connector removably attachable to a hose connected to a pressurized fluid source and including an internal conduit for channeling a flow of pressurized fluid. An inner housing is connected to the injector connector and includes a channel leading to a second opening and a cavity configured to receive an access fitting on an AC system. A one way valve controls flow from the conduit in the injector connector into the inner housing. An adapter is connected to the inner housing and includes a first contour configured to engage with a first fitting and a second contour configured to engage with a second fitting. The inner housing and adapter are movable relative to one another for changing the location of the first contour and second contour.

19 Claims, 12 Drawing Sheets

Related U.S. Application Data on Dec. 21, 2021, provisional application No. 63/188,580, filed on May 14, 2021.

(51) Int. Cl.
  *F16L 29/00* (2006.01)
  *F16K 1/14* (2006.01)
  *F16K 1/36* (2006.01)
(52) U.S. Cl.
  CPC ........ *F25B 45/00* (2013.01); *F25B 2345/006* (2013.01)

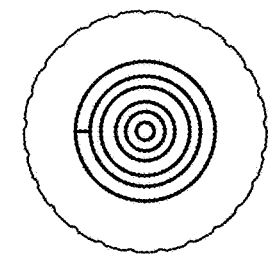
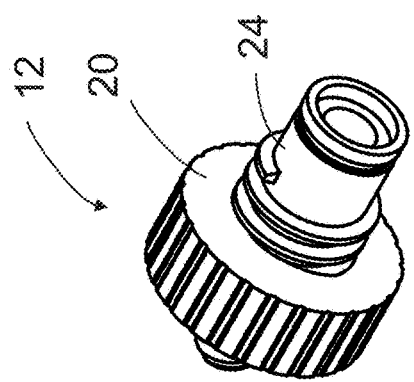
FIG. 2
FIG. 2C
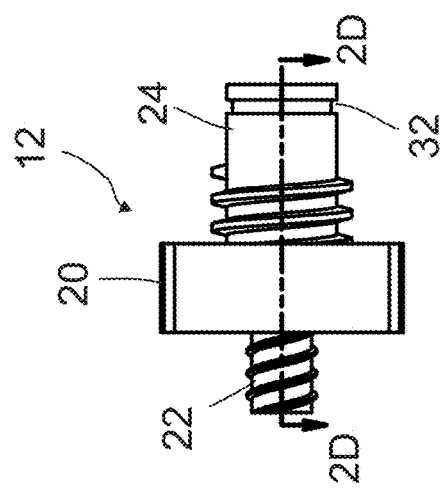
FIG. 2B
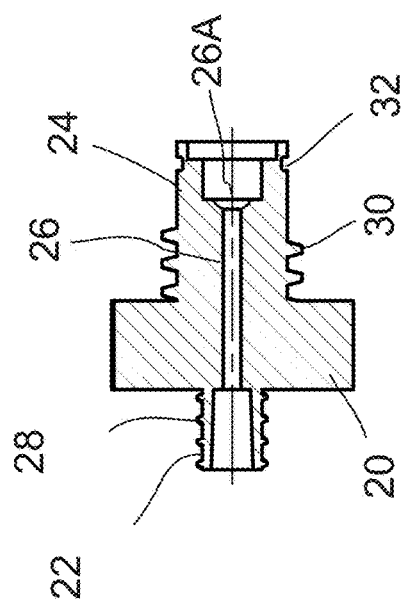
FIG. 2D
FIG. 2A

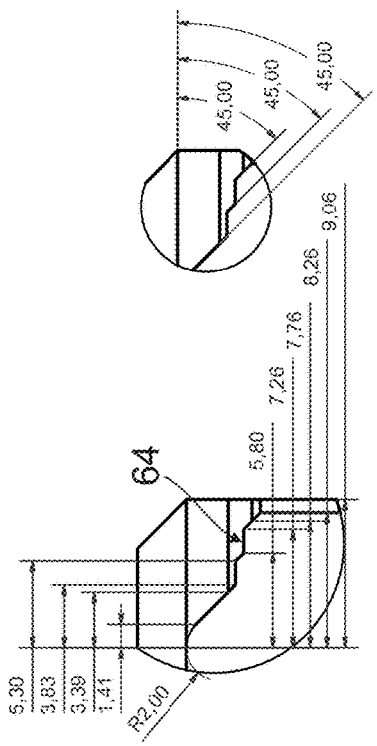
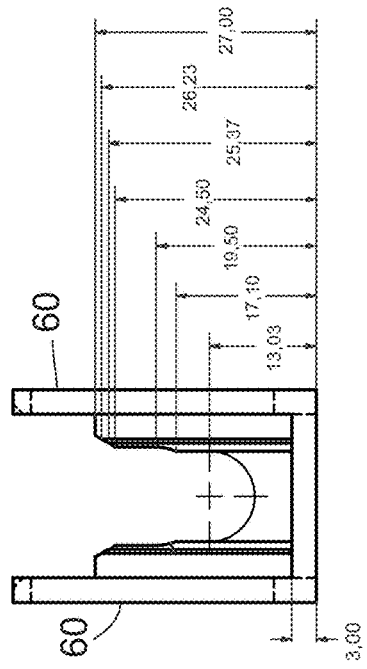
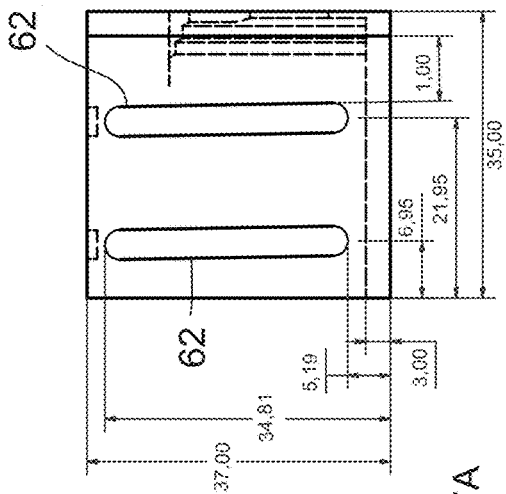
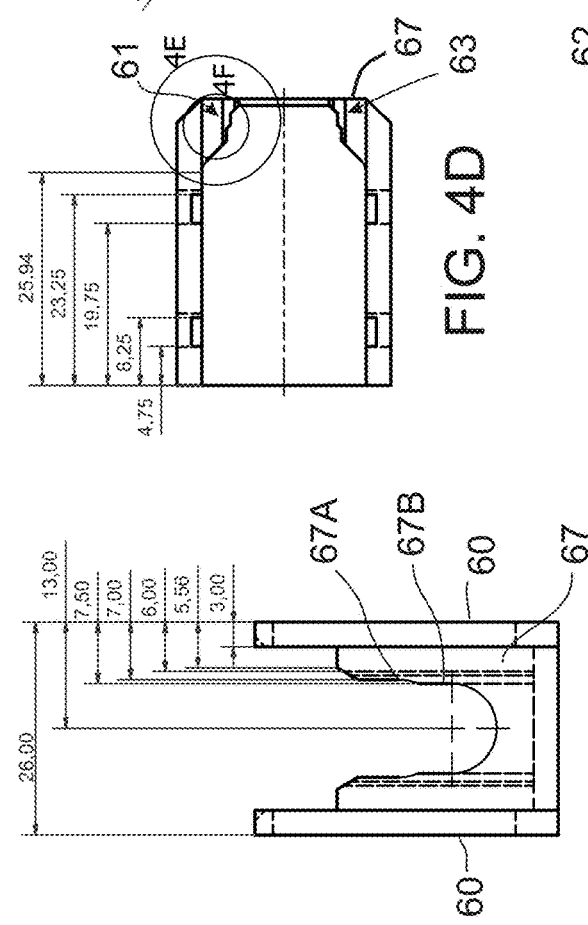
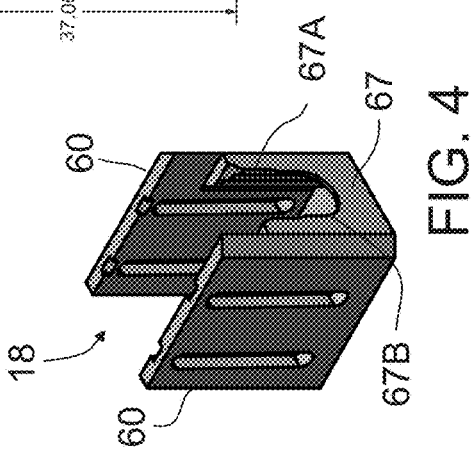

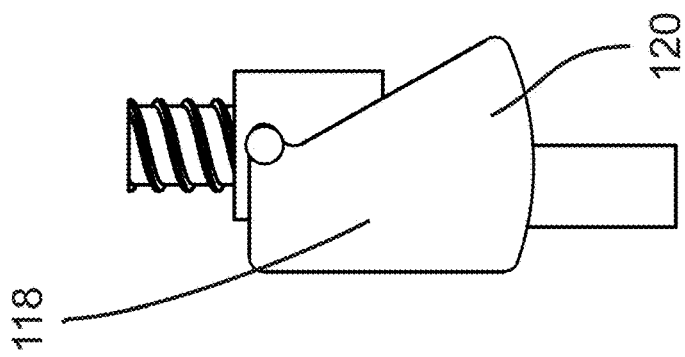
FIG. 6D
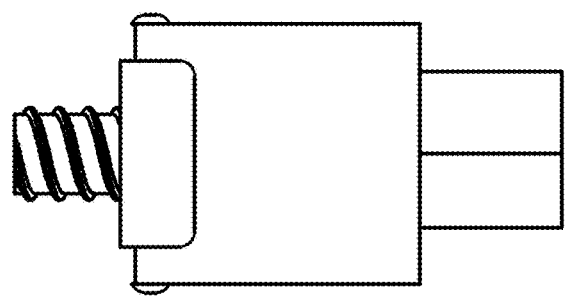
FIG. 6C
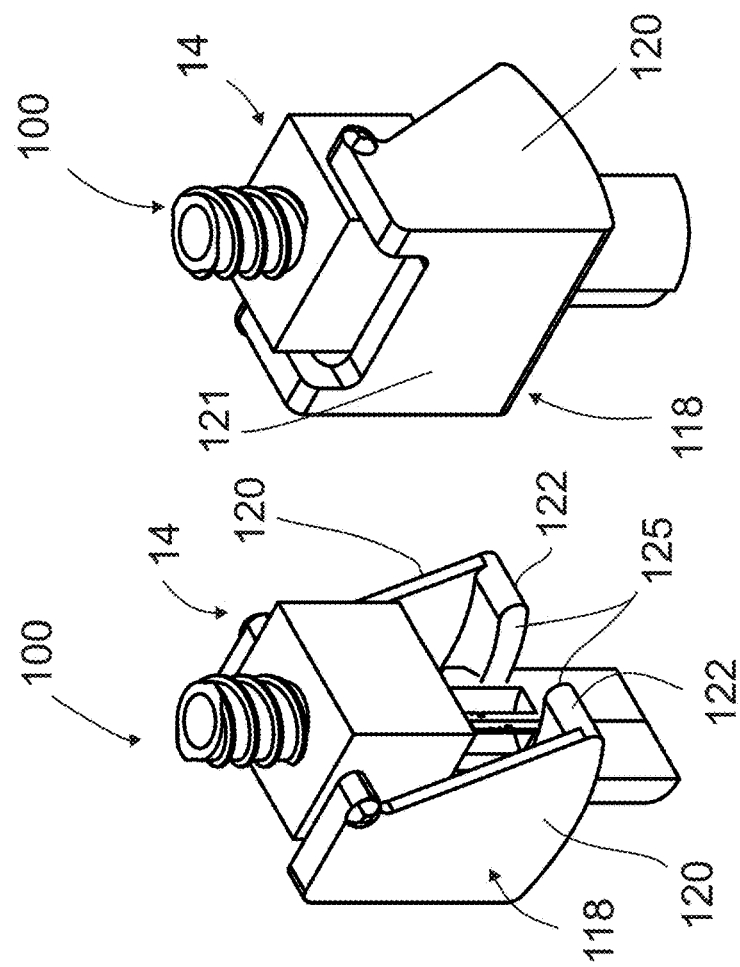
FIG. 6B
FIG. 6A

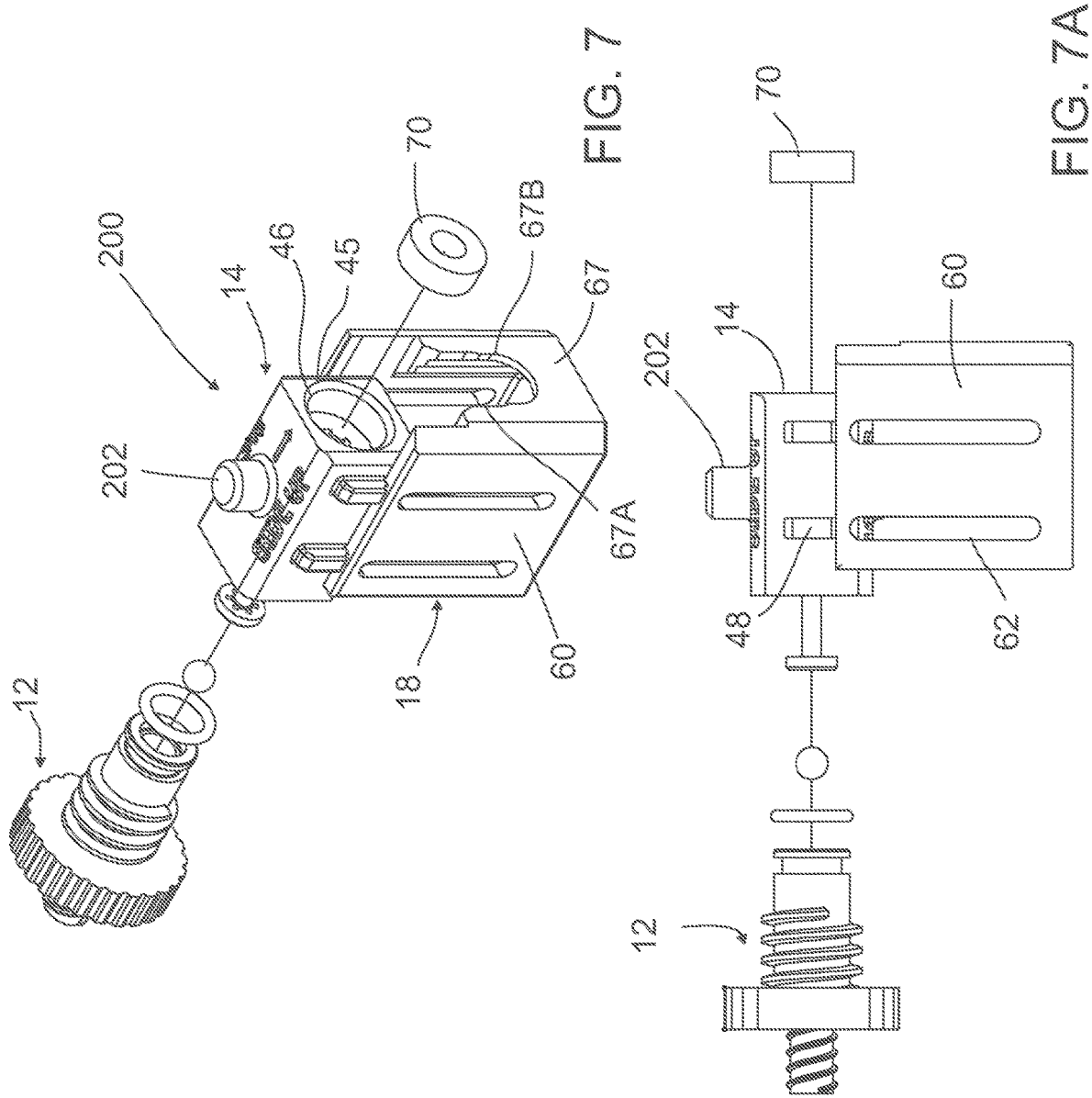

R-1234YF CONFIGURATION

R-134A CONFIGURATION

MULTI-PROFILE ADAPTER ASSEMBLY

RELATED APPLICATIONS

This application is related to and claims priority from U.S. Provisional Application 63/188,580, filed on May 14, 2021; U.S. Provisional Application 63/292,163, filed on Dec. 21, 2021; and U.S. Provisional Application 63/328,337, filed on Apr. 7, 2022; the disclosures of which are incorporated herein by reference in their entireties.

FIELD OF THE INVENTION

The present invention relates to an adapter for a pressurized fluid system and, more particularly, to an adapter assembly for connecting to two or more different types of access fittings for receiving a pressurized fluid, such as on an air conditioning system.

BACKGROUND

Currently, there are two main refrigerants that are being used in the air conditioning market, R-134a and R-1234yf. These refrigerants are not interchangeable. As such, in order to prevent cross-contamination, the access fittings for the air conditioning system differ depending on the type of refrigerant being used. The dimensional differences between the two types of access fittings means that a coupler designed to work with one will not be able to connect to another. As such, service technicians are required to have two sets of equipment, one for each type of refrigerant.

Fluorescent dyes are generally added to air conditioning systems in order to assist in detecting leaks. These dyes are generally introduced into the system through the system service or access fittings. For fluorescent dyes that are compatible with both dyes R-134a and R-1234yf refrigerant, those dyes typically must be provided to the service technician with two hoses, one hose that connects with a R-134a type access fitting and one hose that connects with a R-1234yf type access fitting. This is inconvenient for the service technician and wasteful.

A need exists for an inexpensive adapter assembly that connects to a pressurized source to different access fittings.

SUMMARY

A multi-profile adapter assembly for connecting a pressurized fluid source to different shaped access fittings in an air conditioning system. The adapter assembly includes an injector connector that has a connector housing with an outer port on one end for removably attaching to a pressurized fluid source, an inner port on another end. An internal conduit extends between the outer port and the inner port for channeling a flow of pressurized fluid from the outer port to the inner port.

An inner housing is connected to the injector connector. The inner housing includes a first opening, a main chamber inside the housing that communicates with the first opening on one side and has a restriction channel extending from the other side. The restriction channel extends to a second opening. The second opening includes a cavity configured to receive an access fitting of an air conditioning system.

A one way valve is located in the injector and/or the inner housing for permitting pressurized fluid flow from the conduit in the injector connector into the inner housing and preventing backflow in the opposite direction.

An adapter is provided that has two spaced apart sidewalls and a bottom connecting the sidewalls. The inner housing is located between the sidewalls. The adapter includes a first contour configured to engage with a portion of a first access fitting of an air conditioning system and a second contour configured to engage with a portion of a second access fitting on an air conditioning system. The first and second access fittings have different sizes or shapes.

The inner housing and adapter are movable relative to one another for changing the location of the first contour and second contour relative to the cavity of the center section depending on whether the adapter assembly is configured to connect to the first access fitting or the second access fitting.

A shaft is preferably displaceable within the inner housing and configured to extend into the cavity of the second opening.

In an embodiment, the first access fitting is an R-134a access fitting and the first contour is sized and shaped to engage with an R-134a access fitting. The second access fitting is an R-1234yf access fitting and the second contour is sized and shaped to engage with an R-1234yf access fitting.

In an embodiment the sidewalls of the adapter are connected to an endwall. The first and second contours are stepped profiles located on or inside the endwall. The first contour defines a surface contour that is complementary to the portion of the first access fitting and the second contour defines a surface contour that is complementary to the portion of the second access fitting. The first contour is configured to position the first access fitting at a first height relative to the bottom of the adapter. The second contour is configured to position the second access fitting at a second height relative to the bottom of the adapter.

In an embodiment, the inner housing includes two spaced apart protrusions formed on opposite sides of housing which are configured to slide within slots formed in the adapter so as to allow the location of the inner housing above the bottom to vary.

The center housing may include stand-offs that protrude outward from a top and a bottom of the housing. The stand-off on one side of the housing protrude further from the housing than the stand-off on the opposite side of the housing. The standoffs are configured to position the center housing at two different heights relative to the bottom of the adapter with one position locating a center of the second cavity at a height that is the same as the first height, and the other position locating the center of the second cavity at a height that is the same as the second height.

In an embodiment, the sidewalls of the adapter are pivotally attached to the inner housing. The endwall is curved and is spaced apart from the second opening of the inner housing. The endwall includes a slotted opening with the first contour and the second contour being located on the slotted opening. The first contour is at a different location on the slotted opening than the second contour. The position of the first contour and the second contour relative to a center of the cavity is selected by pivoting of the adapter relative to the inner housing. During use, the first contour is configured to engage with features of a first access fitting and the second contour is configured to engage with features of a second access fitting so as to removably secure the inner housing to the applicable access fitting.

In an embodiment, the center housing is pivotally attached to the sidewall of the adapter so that the center housing can rotate relative to the adapter. The adapter preferably includes two endwalls, one endwall on each end of the adapter. The endwall is connected to the sidewalls.

The endwall has an opening that includes the first contour and the other endwall has an opening that includes the second contour. In use, the center housing is pivoted so as to position the cavity of the center housing adjacent to the first contour when it is desired to connect the adapter assembly to a first access fitting, and the center housing is pivoted so as to position the cavity of the center housing adjacent to the second contour when it is desired to connect the adapter assembly to a second access fitting.

Preferably each sidewall includes an aperture that is sized to receive a protrusion formed on the center housing, the apertures permitting the protrusions to rotate or slide so as to permit the center housing to pivot relative to the adapter.

Preferably the second port of the injector connector is threaded into the first opening in the center housing.

Preferably the injector connector includes a seal located on the inner port and positioned to engage with a portion of the inner housing for providing a fluid seal. Preferably the inner housing includes a seal within the cavity for engaging with the access fitting.

In an embodiment, the one way valve is a poppet valve with a poppet piston that includes a center shaft attached to a poppet head. The poppet head has a plurality of openings extending through head. The center shaft is slidably disposed within the restriction channel in the inner housing with the poppet head located within the chamber. A sealing ball is located between the poppet head and the end of the conduit inside the inner port. The sealing ball is sized to close off the conduit so as to prevent fluid flow between the inner housing and the conduit. The poppet head traps the sealing ball between the poppet head and the conduit so as to permit a small amount of motion of the sealing ball.

Preferably the second port of the injector connector is threaded into the first opening in the center housing and the shaft is displaceable within the cavity of the second opening by threading the injector connector relative to the inner housing.

A method of connecting a pressurized fluid source to an access fitting on an air conditioning system is disclosed. The method involves (i) connecting a pressurized fluid source to the injector connector, (ii) inserting an access fitting on an air conditioning system into the cavity of the second opening, (iii) moving the adapter so as to cause one of either the first contour or the second contour on the adapter to contact the access fitting depending on a type of access fitting, (iv) causing the access fitting to open, and (v) channeling pressurized fluid from the fluid source through the inner housing and into the access fitting.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 2 is a perspective view of an injector connector for use in the adapter assembly of FIG. 1

FIG. 2A is a front view of the injector connector of FIG. 2.

FIG. 2B is a side view of the injector connector of FIG. 2.

FIG. 2C is a rear view of the injector connector of FIG. 2.

FIG. 2D is a cross-sectional view of the injector connector of FIG. 2 taken along lines 2D-2D in FIG. 2B.

FIG. 4 is a perspective view of an adapter for use in the adapter assembly of FIG. 1

FIG. 4A is a front view of the adapter of FIG. 4.

FIG. 4B is a side view of the adapter of FIG. 4.

FIG. 4C is a rear view of the adapter of FIG. 4.

FIG. 4D is a top view of the adapter of FIG. 4.

FIG. 4E is an enlarged view of a portion of the adapter of FIG. 4D.

FIG. 4F is another enlarged view of a portion of the adapter of FIG. 4D.

FIG. 6A is a top perspective view of a multi-profile adapter assembly according to another embodiment of the invention.

FIG. 6B is a rear perspective view of the multi-profile adapter assembly of FIG. 6A.

FIG. 6C is a rear view of the multi-profile adapter assembly of FIG. 6A.

FIG. 6D is a side view of the multi-profile adapter assembly of FIG. 6A.

FIG. 7 is a top perspective view of a multi-profile adapter assembly according to another embodiment of the invention.

FIG. 7A is a side view of the multi-profile adapter assembly of FIG. 7.

DESCRIPTION OF THE EMBODIMENTS

Figure 1:
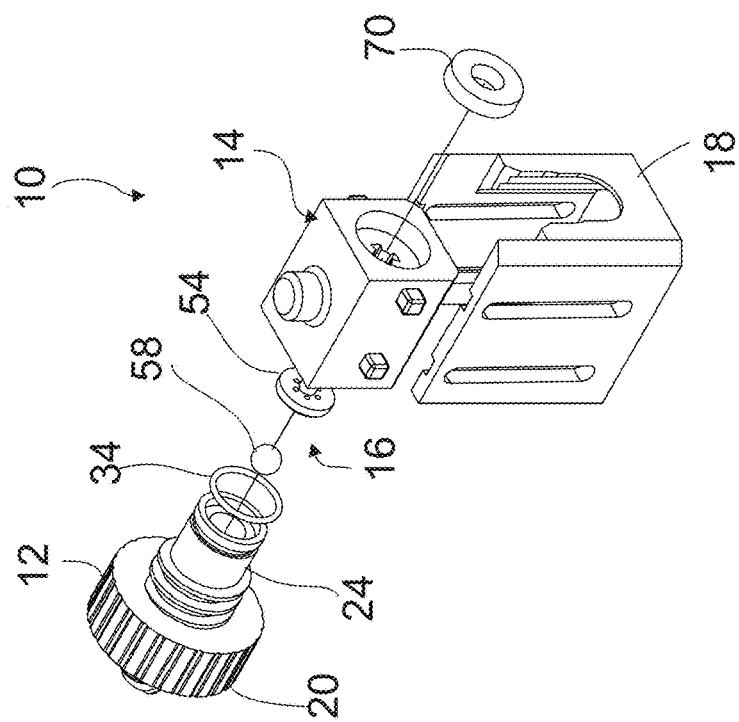
FIG. 1 is a perspective exploded view of a multi-profile adapter assembly according to an embodiment of the invention.

Referring to the figures, the present invention relates to adapter assembly 10 that is connectable to a standard hose, injector, or other fluid source (not shown) and includes components that permit the adapter assembly to attach to different access fittings, such as both R-134a and R-1234yf profiles, on an HVAC system. The R-134a and R1234yf access fittings have profiles (e.g., shapes and sizes) defined by the SAE J639 standard, which is incorporated herein by reference in its entirety. For non-automotive HVAC applications, the access fittings are governed by SAE J512 and SAE J513 standards, which is incorporated herein by reference in its entirety. The assembly 10 includes an injector connector 12 that attaches to a hose, injector, or other fluid source (not shown). In an embodiment, the fluid source supplies fluorescent dye, such as a dye injector or pressurized dye injection system. The present invention can also be connected to other sources of fluids for injection into an HVAC or automotive NC system, such as refrigerant, sealant or oil. The injector connector 12 is attached to an inner or center housing 14 which includes a one way valve, for example, a poppet valve or poppet valve depressor 16. The inner housing 14 is connected to an adapter 18 that is configured to engage different access fittings as discussed in more detail below.

The injector connector 12 is configured to channel a flow of fluid (e.g., fluorescent dye) from the hose or injector into the inner housing 14. The injector connector 12 includes a connector housing 20, an outer port 22 and an inner port 24. An internal conduit 26 extends between the outer port 22 and the inner port 24. The outer port 22 may include threads 28 or barbs for assisting in securing the outer port 22 to a hose or injector. Threads 30 may be formed on the outside of the inner port 24 for connecting with mating threads formed in the inner housing 14 as discussed below. The inner port 24 includes a recessed annual portion 32 on which is located an annular seal 34.

Figure 1A:
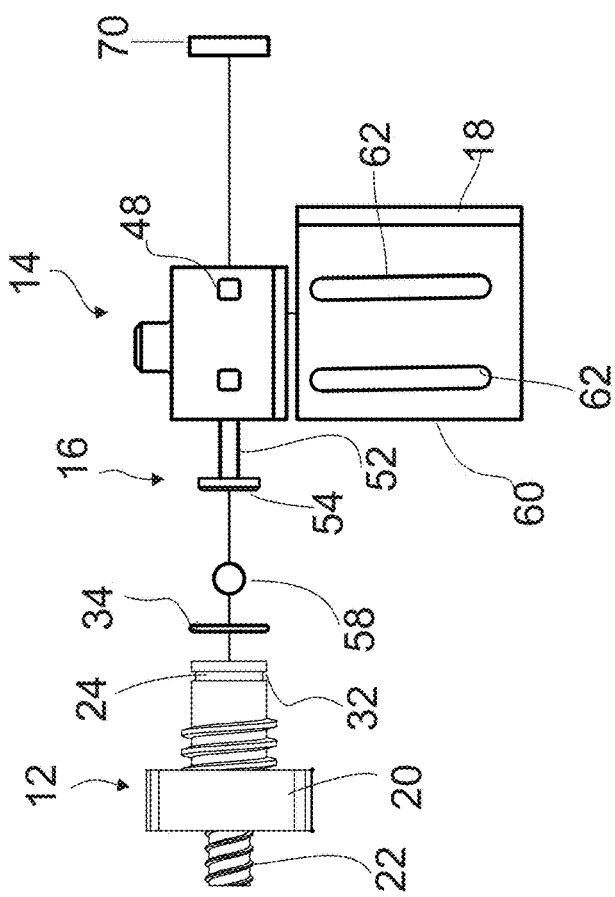
FIG. 1A is an exploded side view of the adapter assembly of FIG. 1.
Figure 3:
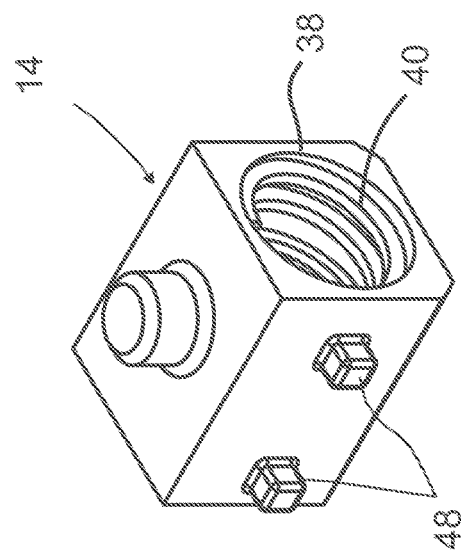
FIG. 3 is a perspective view of an inner housing for use in the adapter assembly of FIG. 1
Figure 3C:
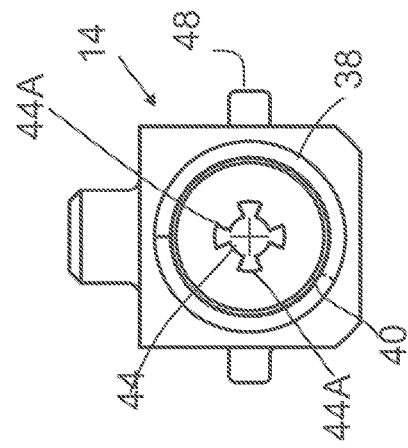
FIG. 3C is a rear view of the inner housing of FIG. 3.
Figure 3B:
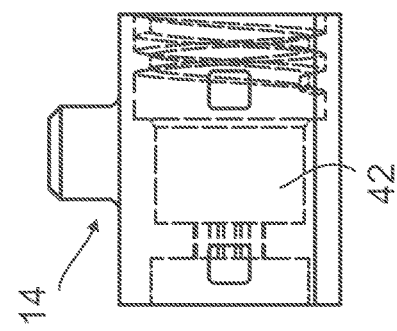
FIG. 3B is a side view of the inner housing of FIG. 3.
Figure 3D:
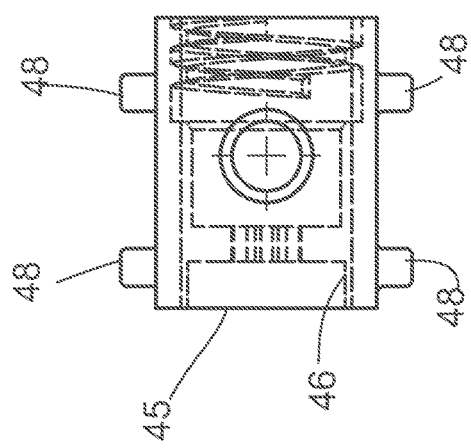
FIG. 3D is a top view of the inner housing of FIG. 3.
Figure 3A:
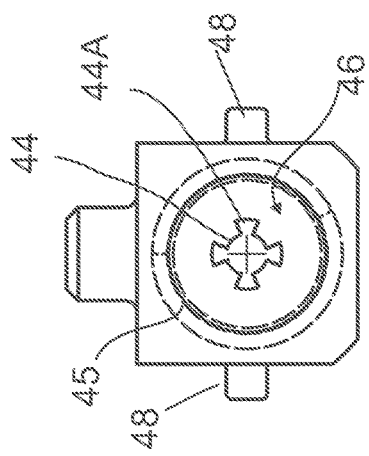
FIG. 3A is a front view of the inner housing of FIG. 3.
Figure 5:
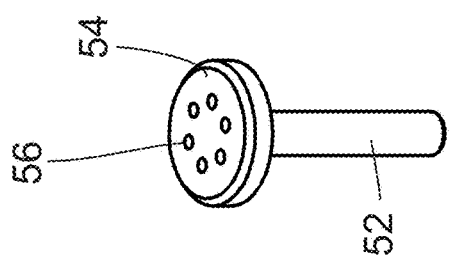
FIG. 5 is a perspective view of a poppet for use in the adapter assembly of FIG. 1
Figure 5D:
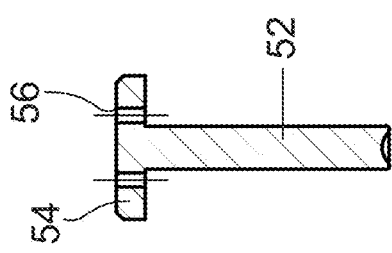
FIG. 5D is a cross-sectional view of the poppet of FIG. 5 taken along lines 5D-5D in FIG. 5A.
Figure 5C:
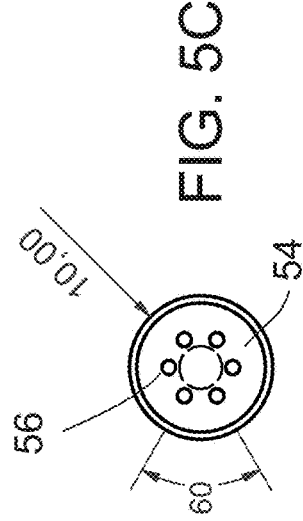
FIG. 5C is a top view of the poppet of FIG. 5.
Figure 5A:
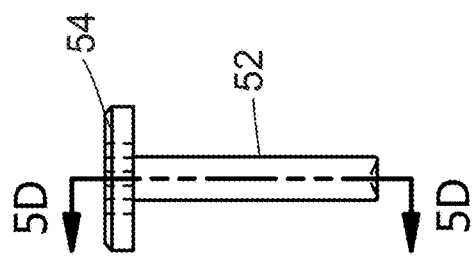
FIG. 5A is a side view of the poppet of FIG. 5.
Figure 5B:
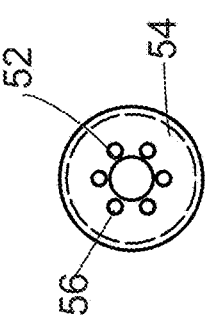
FIG. 5B is a bottom view of the poppet of FIG. 5.
Figure 8A:
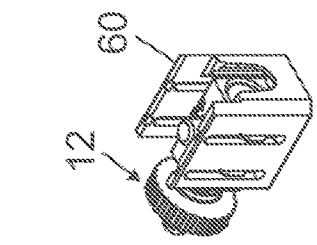
FIG. 8A is a top view of the adapter assembly of FIG. 8.
Figures 8B, 8C:
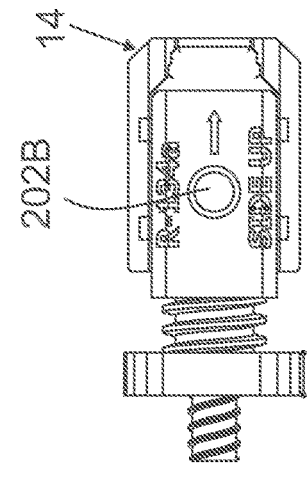
FIG. 8B is a side view of the adapter assembly of FIG. 8.
FIG. 8C is a front view of the adapter assembly of FIG. 8.
Figure 8:
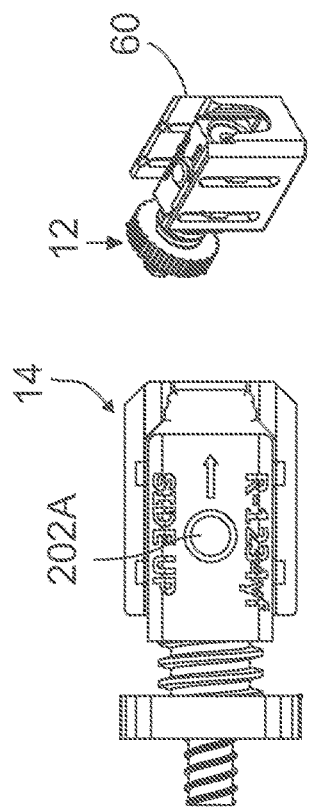
FIG. 8 is a top perspective view of the multi-profile adapter assembly of FIG. 7 with the center housing positioned for use with a R-1234yf access fitting.
Figure 9A:
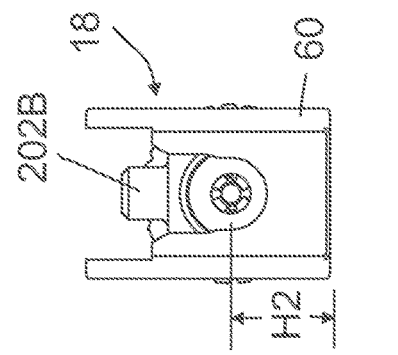
FIG. 9A is a top view of the adapter assembly of FIG. 9.
Figures 9B, 9C:
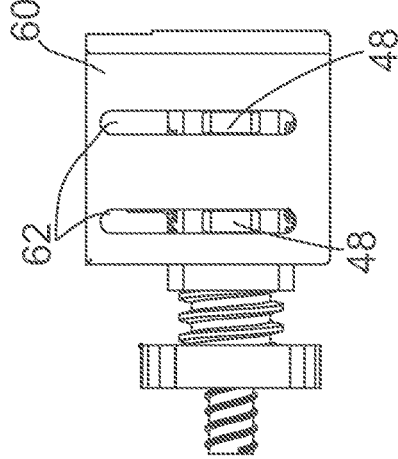
FIG. 9B is a side view of the adapter assembly of FIG. 9.
FIG. 9C is a front view of the adapter assembly of FIG. 9.
Figure 9:
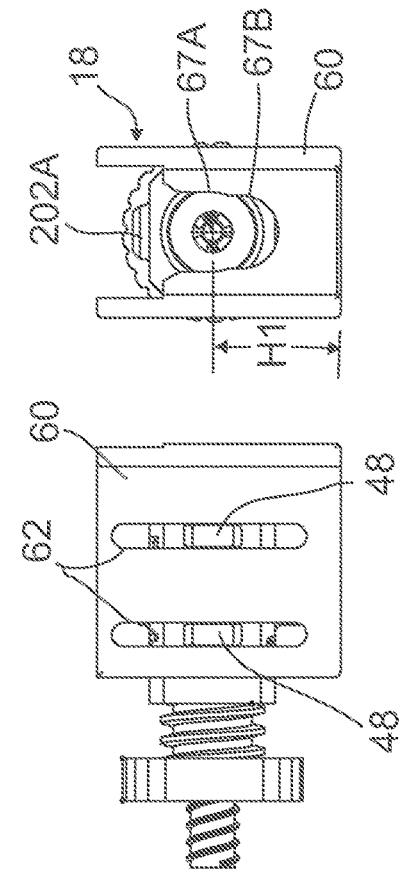
FIG. 9 is a top perspective view of the multi-profile adapter assembly of FIG. 7 with the center housing positioned for use with a R-134a access fitting.

Referring to FIGS. 3, 3A-3D, the inner housing 14 includes a first opening 38 that preferably includes internal threads 40 that mate with the threads 30 on the inner port 24. The inner housing 14 includes a main chamber 42 that communicates with the first opening 38 so as to receive a flow of fluid from the hose through the injector connector during use. The opposite end of the chamber 42 includes a restriction channel 44 that extends from the chamber 42 to a second opening 45. The second opening 45 includes a cavity 46. A rubber or elastomer seal 70 (FIGS. 1 and 1A) is press fit within the cavity 46. The inner housing includes two spaced apart protrusions or nubs 48 formed on opposite sides of the housing 14 which project laterally outward from the housing.

The poppet valve depressor 16 includes a poppet piston 50 that has a center shaft 52 attached to a poppet head 54. A plurality of opening 56 extend through the head 54. Preferably there are six equally spaced openings 56 although any suitable number can be used. The center shaft 52 is slidably disposed within the center of the restriction channel 44 in the inner housing 14 with the poppet head 54 located within the chamber 42. The restriction channel 44 is sized or shaped so as to provide a passage larger than the center shaft 52. In the illustrated embodiment, when the center shaft 52 is located in the restriction channel 44, there are passages 44A that are radially located on the sides of the center shaft 52. The configuration of the restriction channel 44 and the center shaft 52 is such that fluid can pass through the openings 56 and through the portion of the restriction channel 44 around the center shaft 52 (e.g., four passages 44A in FIGS. 3A and 3C).

A sealing ball 58 is located between the poppet head 54 and a semispherical seat 26A formed at the end of the conduit 26 inside the inner port 24 (see FIG. 2D). The sealing ball 58 is sized to close off or seal the conduit 26 when seated in the seat 26A so as to prevent fluid flow through the conduit 26 into the inner housing. The poppet head 54 is preferably mounted inside the inner port 24 by an interference fit. As such, poppet head 54 traps the sealing ball 58 between the poppet head 54 and the seat 26A permitting only a small amount of motion of the sealing ball. It is contemplated that the sealing ball 58 could be snapped into the seat 26A so as to be retained on the injector connector 12 with a small amount of displacement when pressurized fluid is supplied along the conduit 26. Alternatively, a spring could be included between the poppet valve depressor 16 and the center housing 14 so as to bias the poppet head 54 against the sealing ball 58 to maintain sealing of conduit 26 until injection pressure is applied.

One of the functions of the poppet valve, in addition to permitting and preventing flow from the fluid source into the inner housing 14, is to acuate the access fitting. For example, the when the knob 20 on the injector connector 12 is turned so as to screw the injector connector 12 into the inner housing 14, this causes the poppet valve to move further into the inner housing. More specifically, the turning of the knob causes the center shaft 52 of the poppet valve 16 to extend through the restriction channel 44 until it contacts and depresses a valve core in the access fitting. This results in the opening of the access fitting, thereby potentially allowing flow into and out of the access fitting. However, at this point the poppet valve is not actuated. When the pressurized fluid is permitting to flow into the injector connector 12 (such as by opening a valve or actuating an injector on the fluid source), the pressurized fluid overcomes the pressure (coming from the access fitting) that is acting on the back side of the poppet head 54, causing the sealing ball 58 and poppet head 54 to move away from the semispherical seat 26A, thereby opening the one way valve and permitting pressurized fluid to flow into the access fitting. As mentioned above, other one way valves can be used in the injector connector 12 for controlling the flow of fluid into the center housing 14, provided that a feature is incorporated for opening an access fitting (i.e., depresses the core valve) during use. For example, the injector connector 12 could have a shaft formed on it that extends through the restriction channel 44 in the inner housing. Thus, twisting of the knob extends the shaft into the core valve.

Referring to FIGS. 4, and 4A-4F, an embodiment of the adapter 18 is shown. (The dimensions shown are in mm.) The adapter 18 includes two spaced apart sidewalls 60. The spacing between the sidewalls is sized to fit on the sides of the inner housing 14 so that the adapter 18 can slide laterally relative to the inner housing 14. Each sidewall 60 includes two slots 62 that are sized to receive the protrusions 48 on the inner housing 14. The slots 62 function as guides to control the lateral movement of the adapter 18 relative to the inner housing 14 as discussed in more detail below. The spacing between the sidewalls 60 narrows on one end of the adapter 18 and includes first and second contours 61, 63, each designed to mate or engage with a corresponding access fitting, such as an R-134a fitting and an R-1234yf fitting. In an embodiment, the first and second contours 61, 63 define stepped profiles 64 that are formed on an inner surface for both sidewalls 60 (see FIGS. 4E and 4F). The stepped profile is designed to engage with the corresponding profiles of the R-134a and R-1234yf access fittings.

Alternatively, or as part of the stepped profiles, the adapter 18 may include an endwall 67 with a generally U-shaped slotted opening that is wider near its upper portion 67A and narrower in a lower portion 67B. The lower portion 67B is wide enough to accept one of the access fittings but not the other so that the upper portion 67A defines the first contour 61 (or part of the first contour with a portion of the stepped profiles 64) and the lower portion 67B defines the second contour 63 (or part of the second contour with a portion of the stepped profiles 64).

The adapter assembly 10 will be more clearly understood by a discussion of its operation during use. The outer port 22 of the injector connector 12 is attached to a hose or injector that is connected to a supply of a fluorescent dye, sealant, oil or other fluid. The second opening 45 and the seal 70 of the inner housing 14 are placed against an appropriate access fitting. The adapter 18 is slid laterally relative to the housing 14 (upward toward the inner housing in the illustrated embodiment) so that the appropriate first and second contours 61, 63 engage with the corresponding features of the applicable access fitting, thus securely attaching the adapter assembly 10 to the access fitting. When the fluorescent dye, sealant, oil or other fluid is injected (by pressure) into the injector connector 12, it flows along conduit 26 to the opening 26A. The pressurized fluid forces the sealing ball 58 out of the semispherical seat 26A and against the poppet head 54. This results in a flow of fluorescent dye, sealant, oil or other fluid passing around the sealing ball 58 and through the openings 56 in the poppet head 54 and into the chamber 42. Once in the chamber 42, the fluid passes through the passages 44A in the restriction channel 44 and into the access fitting.

Referring to FIGS. 6A-6D, an alternate embodiment of the adapter assembly 100 is shown. In this embodiment, most of the components are the same. However, instead of the adapter being slidably attached to the inner housing, in this embodiment the adapter 118 is pivotally attached to the inner housing 14. The adapter 118 includes two spaced apart sidewalls 120 connected to one another via a bottom 121. Each sidewall 120 is pivotally attached to a pin 123 extending out of the inner housing 14. A curved endwall 122 is attached to each sidewall 120 and spaced apart from the inner housing 14. The endwall 122 includes a U-shaped slotted opening 125 similar to the slotted opening in FIG. 4 that is wider near its upper portion and narrower in a lower portion, such that the lower portion is wide enough to accept one of the access fittings but not the other. The upper portion defines the first contour and the lower portion defines the second contour.

When the second opening 45 on the inner housing 14 and the seal 70 are placed against an access fitting, the adapter is pivoted so that the slotted opening 125 of the endwall 122 slides around the access fitting, thus securing the access fitting into engagement with the seal 70. The curvature of the endwall 122 and the pivoting of the sidewalls 120 are configured to cause the slotted opening to engage different access fittings depending on the pivoting of the adapter 118.

Referring now to FIGS. 7 and 7A, 8, 8A-8C, 9 and 9A-9C, an alternate embodiment of the adapter assembly 200 is shown. In this embodiment, the orientation of the center housing 14 relative to the adapter 18 determines the connection between the adapter assembly 200 and the access fittings. The injector connector 12, center housing 14 and adapter 18 are similar to the first embodiment discussed above and, thus, not discussed in detail. In this embodiment, the center housing 14 includes stand-offs or legs 202 that protrude outward from the top and bottom of housing 14. More specifically, the stand-off(s) 202 on one side of the housing 14 protrude further from the housing 14 than the stand-off(s) 202 on the opposite side of the housing 14. This results in the positioning of the second cavity 46 and seal 70 at the proper height relative to the adapter 18 to mate with the corresponding access fitting.

Specifically, with reference to FIGS. 8, and 8A-8C, one side of the housing 14 may include marking or other indicia, such as "R-1234yf Side Up", to indicate to the user that it is oriented and configured for engagement with a R-1234yf access fitting. This side of the housing 14 includes a short stand-off 202A facing upward and a taller stand-off 202B on the bottom. The housing 14 is snapped into the adapter 18 such that its protrusions 48 are in the slots 62. This results in the center of the second cavity 46 being located at a first height H1 relative to the bottom of the adapter 18. This height is configured to that the second cavity is positioned to engage with a R-1234yf access fitting.

Turning now to FIGS. 9, and 9A-9C, the housing 14 is shown positioned with its opposite side facing upwards. This side of the housing 14 may include marking or other indicia, such as "R-134a Side Up", to indicate to the user that it is oriented and configured for engagement with a R-134a access fitting. This side of the housing includes the tall stand-off 202B facing upward and the short stand-off 202A on the bottom. As such, when the housing 14 is snapped into the adapter 18 with its protrusions 48 are in the slots 62, the result is that the center of the second cavity 46 is located at a second height H2 relative to the bottom of the adapter 18 that is smaller than the first height H1. This height is configured to that the second cavity is positioned to engage with a R-134a access fitting.

Referring now to FIGS. 10A-10G, another embodiment of an adapter assembly 300 is shown. The adapter assembly 300 includes an adapter 318 with two spaced apart sidewalls 318A, 318B. The spacing between the sidewalls is sized to receive a center housing 314 so that the center housing 314 can rotate (pivot) relative to the adapter 318 as discussed below. Each sidewall 318A, 318B includes a slot or hole 350 that is sized to receive a protrusion 352 formed on the center housing 314. The slots 350 function as guides to control the lateral movement of the center housing 314 and allow the center housing 314 to rotate (pivot) relative to the adapter 318. The adapter 318 includes first and second stepped profiles 318C, 318D on the inner surfaces for the sidewalls 318A, 318B and or as part of endwalls 320A, 320B on the adapter 318. One of the stepped profiles (e.g., 318C) is configured to engage with the corresponding profile of a R-1234yf access fitting and the other stepped profile (e.g., 318D) is configured to engage with the corresponding profile of a R-134a access fitting.

The injector connector 312 is similar to the injector connector discussed above and includes an outer port 312A configured to connect to a hose or injector (not shown). On the opposite side of the injector connector 312 has a threaded end 312C which is configured to thread into the first opening 314A in the center housing 314 and to translate a shaft 322 extending through the center housing 314 as discussed in the above embodiments for actuating (opening) an access fitting during use. The injector connector 312 also includes a knob 312B to facilitate rotating the threaded end 312C into and out of the first opening of the center housing 314 for translating the shaft 322. The opposite end of the center housing 314 includes a second opening 314B configured to engage with an appropriate access fitting as discussed below. The shaft 322 extends into the cavity of the second opening 314B when it is desired to actuate (open) the access fitting (see FIG. 10A).

Figure 10A:
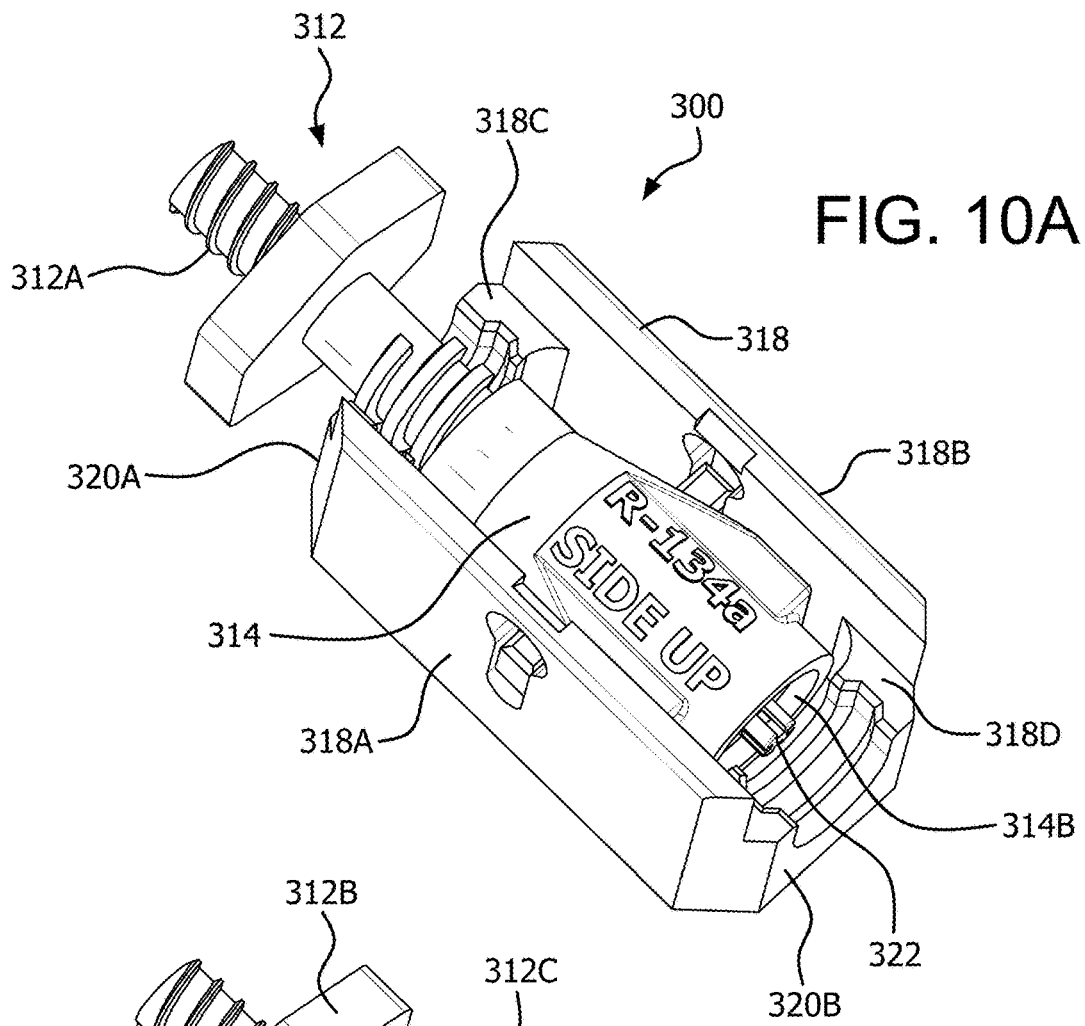
FIG. 10A is a top perspective view of a multi-profile adapter assembly according to another embodiment of the invention arranged to connect a fluid source to a R-134a access fitting.
Figure 10B:
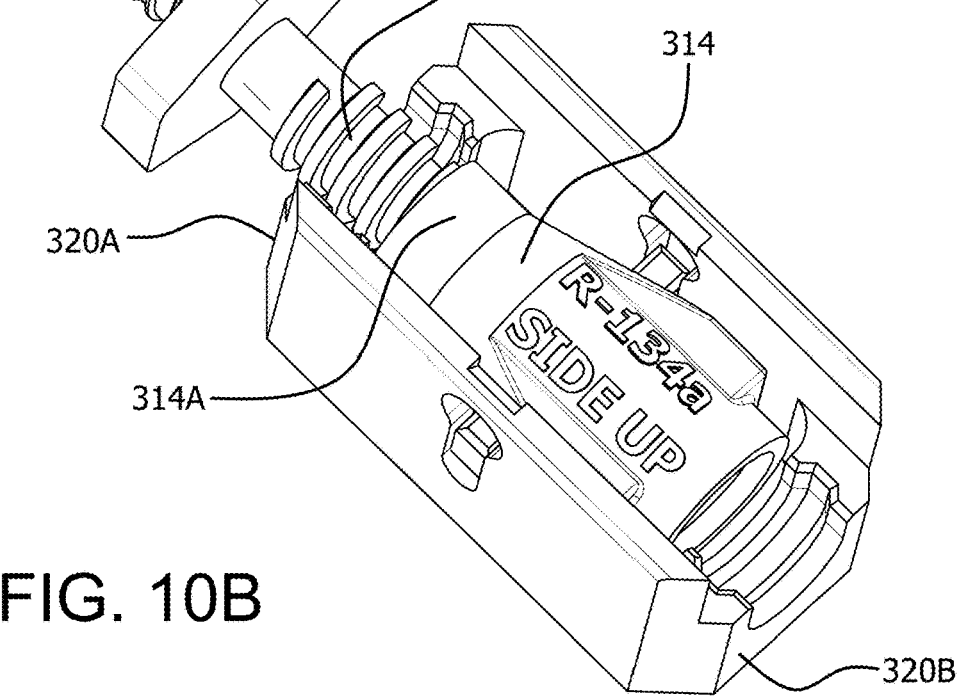
FIG. 10B is a top perspective view of the multi-profile adapter assembly of FIG. 10A with the injector connector loosened.
Figure 10C:
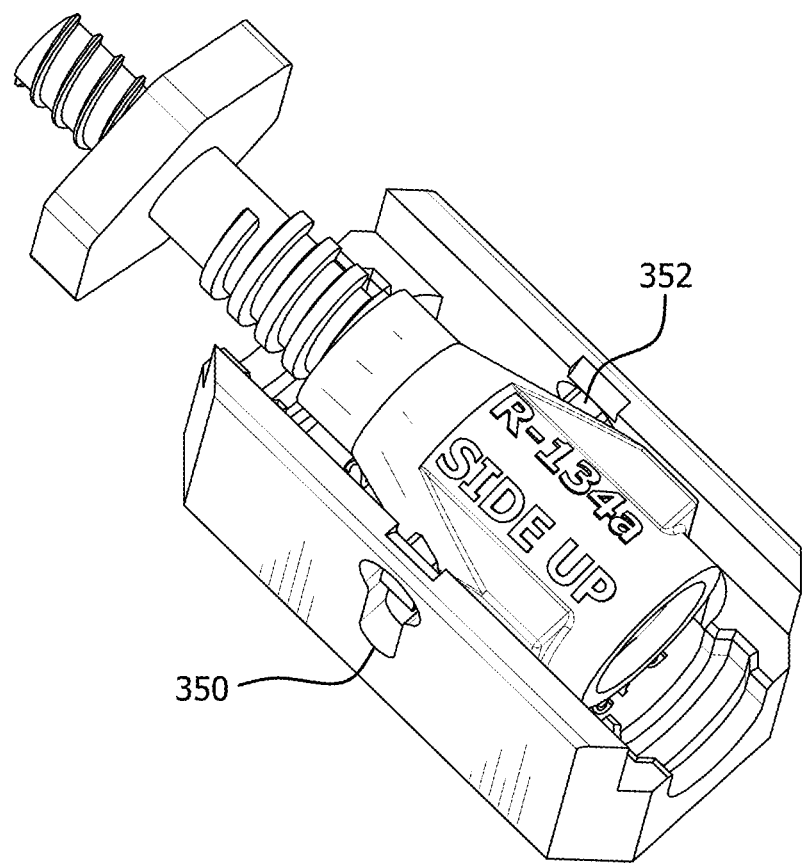
FIG. 10C is a top perspective view of the multi-profile adapter assembly of FIG. 10A showing the center housing slid laterally in the adapter.
Figure 10D:
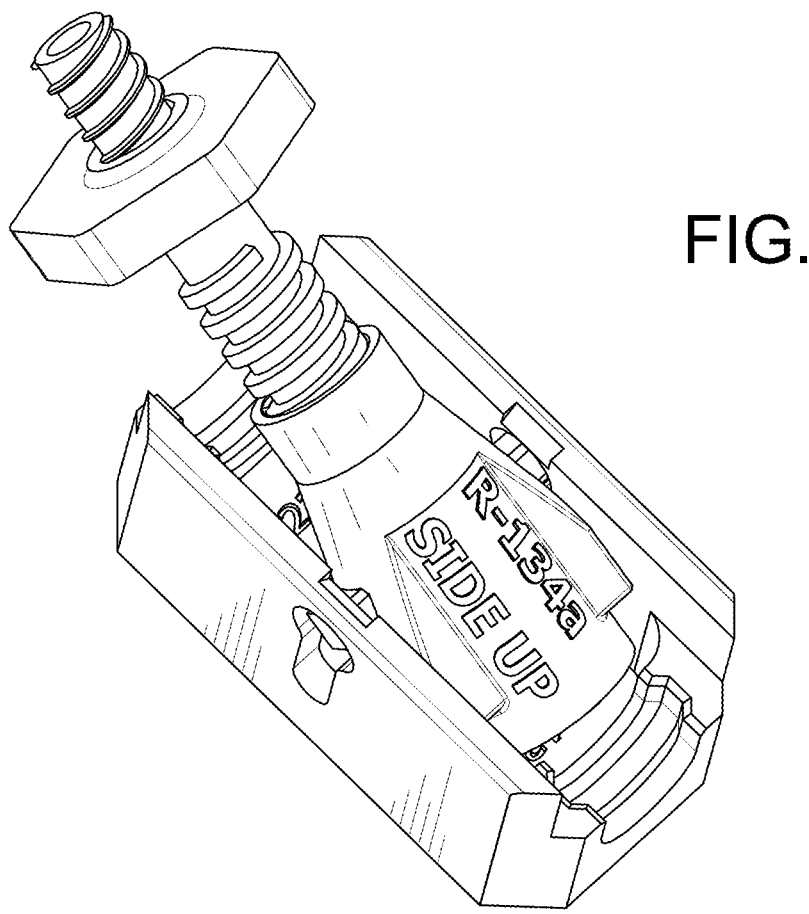
FIGS. 10D-10F is a top perspective view of the multi-profile adapter assembly of FIG. 10A showing the center housing being pivoted relative to the adapter.
Figure 10E:
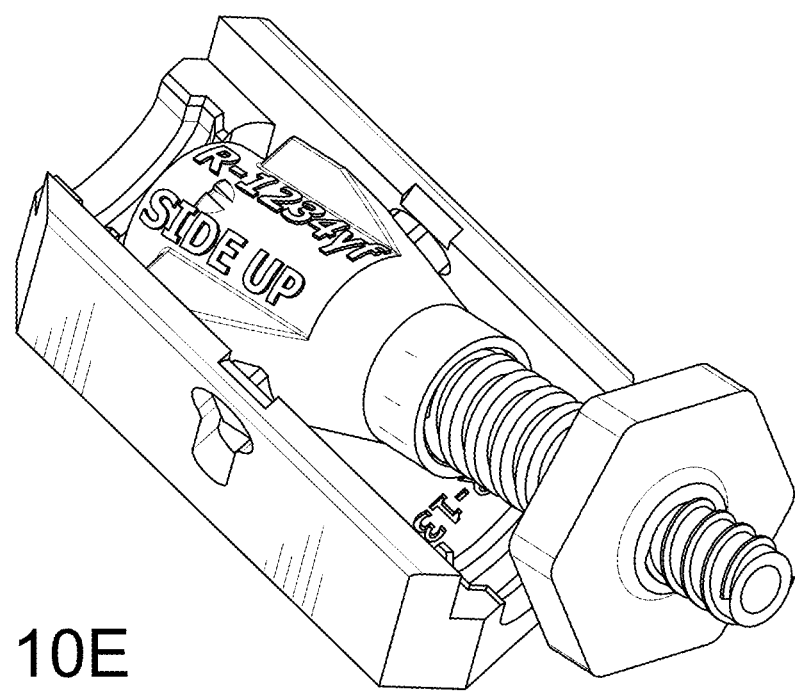
Figure 10F:
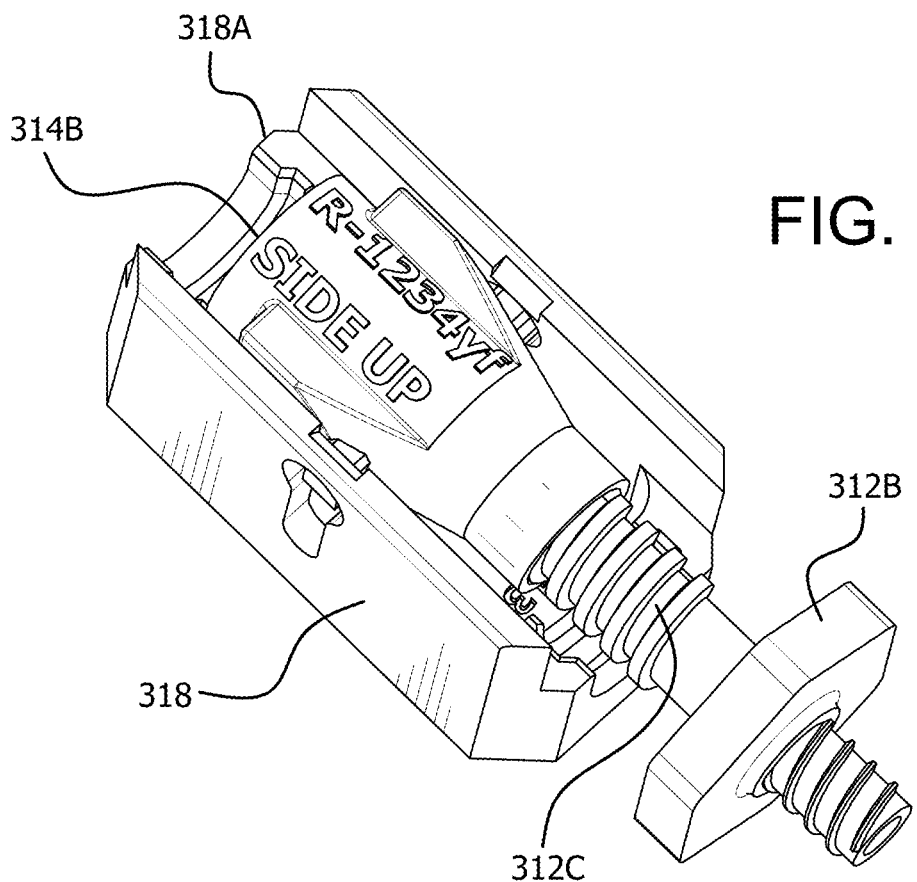
Figure 10G:
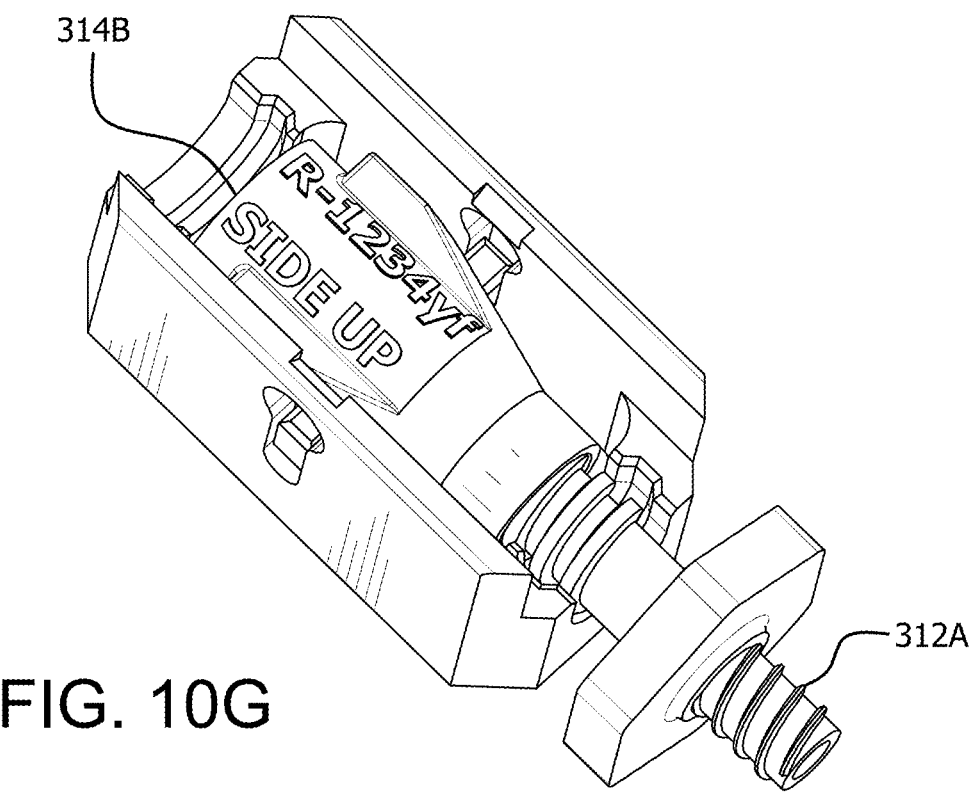
FIG. 10G is a top perspective view of the multi-profile adapter assembly of FIG. 10A showing the injector connector tightened against the adapter and the adapter assembly arranged to connect a fluid source to a R-1234yf access fitting.

The adapter assembly 300 will be more clearly understood by a discussion of its operation during use. The adapter 318 is designed to permit the user to rotate (pivot) the center housing 314 relative to the adapter 318 depending on which type of refrigerant is being used. As shown in FIG. 10A, the adapter assembly 300 is arranged to receive R-134a refrigerant as depicted based on the orientation of the center housing 314. The side of the housing 314 may include marking or other indicia, such as "R-134a Side Up", to indicate to the user that it is oriented and configured for engagement with a R-134a access fitting. FIG. 10G shows the center housing 314 positioned with its opposite side facing upwards. That side of the housing 314 may include marking or other indicia, such as "R-1234yf Side Up", to indicate to the user that it is oriented and configured for engagement with a R-1234yf access fitting.

Assuming the user is using R-134a refrigerant and the adapter assembly is arranged as shown in FIG. 10A, the user connects the outer port 312A to a hose or injector on a fluid supply. In this arrangement, the second stepped profile (e.g., 318D) is positioned adjacent to the second opening 314B and is configured to engage with the corresponding profile of the R-134a access fitting. Thus, the second stepped profile allows the second opening 314B to be engaged with an R-134a access fitting. When the injector connector 312 is twisted sufficiently into the center housing 314, the shaft 322 will open up the access fitting. The fluid can then be supplied by opening the pressurized supply or injecting the fluid using an injector.

In the event it is desired to supply R-1234yf refrigerant, the user turns the knob 312B so as to loosen the center housing 314 (FIG. 10B) (and close the access fitting if the assembly was attached to an access fitting). The user then slides the center housing 314 laterally away from the adapter 318 (FIG. 10C) (i.e., the protrusions 352 slide within the slots 350). The housing 314 can then be rotated relative to the adapter 318 (i.e., the protrusions 352 rotate within the slots 350) (FIGS. 10D, 10E) until the side of the housing 314 that includes the indicia "R-1234yf Side Up" faces upward (FIG. 10F). The user slides the housing 314 downward in the slots 350. The user connects the adapter 318 and the second opening 314B to the R-1234yf access fitting and then tightens the knob 312B causing the threaded end 312C to thread into the center housing 314 and the internal shaft 322 to open the access fitting. Once the knob 312B contacts the end of the adapter 318, it locks the injector connector 312 and center housing 314 into the adapter 318. It should be readily apparent that other mechanisms could be used for locking the injector connector 312 and center housing 314 into the adapter 318.

At this stage, the user can connect the outer port 312A to a hose or injector. In this arrangement, the first stepped profile (e.g., 318C) is positioned adjacent to the second opening 314B and is configured to engage with the corresponding profile of the R-1234yf access fitting. Thus, the first stepped profile permits the second opening 314B to be engaged with the R-1234yf access fitting. The fluid can then be supplied as discussed above.

While the connector and inner housing are shown as two separate components, it is contemplated that they could be formed as an integral unit and the one way valve could be placed on either end.

The above discussion describes use of the invention for attaching to R-134a and R-1234yf access fittings. However, it should be readily apparent that the invention can be used to attach different type of access fittings. For example, in automotive systems, the different access fittings can be used for different refrigerant sources, such as an R-152a refrigerant. The first and second contours would be altered to mate with or include a complementary shape that engages with different access fittings.

It is further contemplated that, instead of contoured surfaces on the adapter for engaging with the access fittings, if the access fittings have threaded ends, such as those used in the residential or commercial A/C systems, the adapter could include mating threads (or more preferably half threads). For example, referring to FIG. 10A, the adapter 318 could include a first set of half threads on surface 318C and a second set of half threads on surface 318D, where first and second sets have different diameters or thread sizes.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

Terms such as "about" or "approximately", unless otherwise defined or restricted in the specification, should be understood to define a variance of plus or minus 5%-10% to the numerical term or amount referred to.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. A multi-profile adapter assembly for connecting a pressurized fluid source to different shaped access fittings in an air conditioning system, the adapter assembly comprising:
   an injector connector including a connector housing with an outer port on one end for removably attaching to a pressurized fluid source, an inner port on another end and an internal conduit extending between the outer port and the inner port for channeling a flow of pressurized fluid from the outer port to the inner port;
   an inner housing connected to the injector connector, the inner housing including a first opening, a main chamber that communicates with the first opening on one side and a restriction channel on the other, the restriction channel extending from the main chamber to a second opening, the second opening including a cavity configured to receive an access fitting on an air conditioning system;
   a one way valve located in the injector and/or the inner housing for permitting pressurized fluid flow from the conduit in the injector connector into the inner housing; and
   an adapter with two spaced apart sidewalls and a bottom connecting the sidewalls, the inner housing being located between the sidewalls, the adapter including a first contour configured to engage with a portion of a first access fitting of an air conditioning system and a second contour configured to engage with a portion of a second access fitting on an air conditioning system, where the first and second access fittings have different sizes or shapes; and
   wherein the inner housing and adapter are movable relative to one another for changing the location of the first contour and second contour relative to the cavity of the inner housing depending on whether the adapter assembly is configured to connect to the first access fitting or the second access fitting.

2. The multi-profile adapter assembly according to claim 1, further comprising a shaft displaceable within the inner housing and configured to extend into the cavity of the second opening.

3. The multi-profile adapter assembly according to claim 2, wherein the first access fitting is an R-134a access fitting and the first contour is sized and shaped to engage with an R-134a access fitting, and the second access fitting is an R-1234yf access fitting and the second contour is sized and shaped to engage with an R-1234yf access fitting.

4. The multi-profile adapter assembly according to claim 2, wherein the sidewalls are connected to an endwall, wherein the first and second contours are stepped profiles located on or inside the endwall, the first contour defining a surface contour that is complementary to the portion of the first access fitting and the second contour defining a surface contour that is complementary to the portion of the second access fitting, wherein the first contour is configured to position the first access fitting at a first height relative to the bottom of the adapter, and the second contour is configured to position the second access fitting at a second height relative to the bottom of the adapter.

5. The multi-profile adapter assembly according to claim 4, wherein the inner housing includes two spaced apart protrusions formed on opposite sides of housing and configured to slide within slots formed in the adapter so as to allow the location of the inner housing above the bottom to vary.

6. The multi-profile adapter assembly according to claim 4, wherein the inner housing includes stand-offs that protrude outward from a top and a bottom of the housing, the stand-off on one side of the housing protruding further from the housing than the stand-off on the opposite side of the housing, the standoffs configured to position the inner housing at two different heights relative to the bottom of the adapter, one position locating a center of the cavity of the second opening at a height that is the same as the first height, and the other position locating the center of the cavity at a height that is the same as the second height.

7. The multi-profile adapter assembly according to claim 4, wherein the second port of the injector connector is threaded into the first opening in the inner housing and wherein the shaft is displaceable within the cavity of the second opening by threading the injector connector relative to the inner housing.

8. The multi-profile adapter assembly according to claim 2, wherein the inner housing is pivotally attached to the sidewall so that the inner housing can rotate relative to the adapter;
   wherein the adapter includes two endwalls, one endwall on each end of the adapter, each endwall connecting to the sidewalls, one endwall has an opening that includes the first contour and the other endwall has an opening that includes the second contour; and
   wherein the inner housing is pivoted so as to position the cavity of the inner housing adjacent to the first contour when it is desired to connect the adapter assembly to a first access fitting, and wherein the inner housing is pivoted so as to position the cavity of the inner housing adjacent to the second contour when it is desired to connect the adapter assembly to a second access fitting.

9. The multi-profile adapter assembly according to claim 8, wherein the second port of the injector connector is threaded into the first opening in the inner housing and wherein the shaft is displaceable within the cavity of the second opening by threading the injector connector relative to the inner housing.

10. The multi-profile adapter assembly according to claim 8, wherein the one way valve is a poppet valve with a poppet piston that includes a center shaft attached to a poppet head, the poppet head having a plurality of openings extending through head, the center shaft being slidably disposed within the restriction channel in the inner housing with the poppet head located within the chamber, and a sealing ball located between the poppet head and the end of the conduit inside the inner port, the sealing ball is sized to close off the conduit so as to prevent fluid flow through the conduit and into the inner housing, the poppet head trapping the sealing ball between the poppet head and the conduit so as to permit a small amount of motion of the sealing ball.

11. The multi-profile adapter assembly according to claim 2, wherein the second port of the injector connector is threaded into the first opening in the inner housing and wherein the shaft is displaceable within the cavity of the second opening by threading the injector connector relative to the inner housing.

12. The multi-profile adapter assembly according to claim 1, wherein the sidewalls of the adapter are pivotally attached to the inner housing, wherein the endwall is curved and is spaced apart from the second opening of the inner housing, the endwall including a slotted opening, the first contour and the second contour being located on the slotted opening, the first contour being at a different location on the slotted opening than the second contour, wherein the position of the first contour and the second contour relative to a center of the cavity is selected by pivoting of the adapter relative to the inner housing, wherein during use the first contour is configured to engage with features of a first access fitting and the second contour is configured to engage with features of a second access fitting so as to removably secure the inner housing to the applicable access fitting.

13. The multi-profile adapter assembly according to claim 12, wherein the second port of the injector connector is threaded into the first opening in the inner housing and wherein the shaft is displaceable within the cavity of the second opening by threading the injector connector relative to the inner housing.

14. The multi-profile adapter assembly according to claim 12, wherein the one way valve is a poppet valve with a poppet piston that includes a center shaft attached to a poppet head, the poppet head having a plurality of openings extending through head, the center shaft being slidably disposed within the restriction channel in the inner housing with the poppet head located within the chamber, and a sealing ball located between the poppet head and the end of the conduit inside the inner port, the sealing ball is sized to close off the conduit so as to prevent fluid flow through the conduit and into the inner housing, the poppet head trapping the sealing ball between the poppet head and the conduit so as to permit a small amount of motion of the sealing ball.

15. The multi-profile adapter assembly according to claim 1, wherein each sidewall includes an aperture that is sized to receive a protrusion formed on the inner housing, the apertures permitting the protrusions to rotate or slide so as to permit the inner housing to pivot relative to the adapter.

16. The multi-profile adapter assembly according to claim 1, wherein the inner port of the injector connector is threaded into the first opening in the inner housing.

17. The multi-profile adapter assembly according to claim 1, wherein the injector connector includes a seal located on the inner port and positioned to engage with a portion of the inner housing for providing a fluid seal; and wherein the inner housing includes a seal within the cavity.

18. The multi-profile adapter assembly according to claim 1, wherein the one way valve is a poppet valve with a poppet piston that includes a center shaft attached to a poppet head, the poppet head having a plurality of openings extending through head, the center shaft being slidably disposed within the restriction channel in the inner housing with the poppet head located within the chamber, and a sealing ball located between the poppet head and the end of the conduit inside the inner port, the sealing ball is sized to close off the conduit so as to prevent fluid flow through the conduit and into the inner housing, the poppet head trapping the sealing ball between the poppet head and the conduit so as to permit a small amount of motion of the sealing ball.

19. A method of connecting a pressurized fluid source to an access fitting on an air conditioning system, the method comprising the steps of:
   providing a multi-profile adapter assembly according to claim 1;
   connecting a pressurized fluid source to the injector connector;
   inserting an access fitting on an air conditioning system into the cavity of the second opening;
   moving the adapter so as to cause one of either the first contour or the second contour on the adapter to contact the access fitting depending on a type of access fitting;
   causing the access fitting to open; and
   channeling pressurized fluid from the fluid source through the inner housing and into the access fitting.

* * * * *